(12) United States Patent
Sato et al.

(10) Patent No.: US 7,540,193 B2
(45) Date of Patent: Jun. 2, 2009

(54) TRIAXIAL ACCELERATION SENSOR MODULE AND METHOD OF MANUFACTURING THE SAME

(75) Inventors: Masahiro Sato, Tachiyagawa (JP); Takayuki Sugano, Tachiyagawa (JP)

(73) Assignee: Mitsumi Electric Co., Ltd. (JP)

( * ) Notice: Subject to any disclaimer, the term of this patent is extended or adjusted under 35 U.S.C. 154(b) by 362 days.

(21) Appl. No.: 11/321,887

(22) Filed: Dec. 28, 2005

(65) Prior Publication Data
US 2006/0201251 A1    Sep. 14, 2006

(30) Foreign Application Priority Data
Mar. 8, 2005    (JP)    ............... 2005-064425

(51) Int. Cl.
*G01P 15/12*    (2006.01)
(52) U.S. Cl. ............................. 73/514.33; 73/493
(58) Field of Classification Search ........... 73/493, 73/514.33; 438/50, 51
See application file for complete search history.

(56) References Cited
U.S. PATENT DOCUMENTS

| | | | | |
|---|---|---|---|---|
| 4,941,354 A | * | 7/1990 | Russell et al. | ............ 73/514.24 |
| 5,085,079 A | * | 2/1992 | Holdren et al. | ........... 73/514.23 |
| 5,295,386 A | * | 3/1994 | Okada | ........................ 73/1.07 |
| 5,485,749 A | * | 1/1996 | Nohara et al. | ............. 73/514.33 |
| 6,772,632 B2 | * | 8/2004 | Okada | ..................... 73/514.38 |

FOREIGN PATENT DOCUMENTS

JP    2000-105252    4/2000

* cited by examiner

*Primary Examiner*—John E Chapman
(74) *Attorney, Agent, or Firm*—Marger Johnson & McCollom, P.C.

(57) ABSTRACT

A triaxial acceleration sensor module 100 includes: a hollow housing 30 provided with a partition plate 31 having a through-hole 32; a triaxial acceleration sensor 1 provided inside the housing 30; and a sensor driving IC 40 for driving the triaxial acceleration sensor 1. The triaxial acceleration sensor 1 includes: a frame 23; a weight member 22 provided inside the frame 23; a weight member supporting portion 15 for supporting the weight member 22 in a freely suspended manner; and a plurality of flexible beams each having piezo resistance elements 13 thereon. In the triaxial acceleration sensor module 100, the through-hole 32 has a size through which the triaxial acceleration sensor 1 can pass. Further, the triaxial acceleration sensor 1 is directly bonded to the sensor driving IC 40 via the through-hole 32, and the sensor driving IC 40 is bonded to the partition plate 31 of the housing 30.

8 Claims, 4 Drawing Sheets

TRIAXIAL ACCELERATION SENSOR MODULE AND METHOD OF MANUFACTURING THE SAME

CROSS-REFERENCE TO RELATED APPLICATION

This application claims priority to Japanese Patent Application No. 2005-64425 filed Mar. 8, 2005, which is hereby expressly incorporated by reference herein in its entirety.

BACKGROUND OF THE INVENTION

1. Field of the Invention

The present invention is related to a triaxial (3-axis) acceleration sensor and a method of manufacturing a triaxial (3-axis) acceleration sensor.

2. Description of the Prior Art

Conventionally, a triaxial (3-axis) acceleration sensor is known that can detect acceleration in 3-axis directions, for example. The 3-axis acceleration sensor known in the art includes: a support frame of substantially rectangular shape made of silicon; a plurality of thin beams with flexibility provided inside the support frame; a weight member oscillatably supported by the plurality of beams; and a plurality of bridge circuits constituted from piezo resistance elements respectively disposed on the beams and interconnected by metallic wiring lines.

Such a triaxial acceleration sensor generally has a configuration in which, in order to prevent excessive displacement of a weight member within a housing, a gap is formed in the housing so as to surround the weight member so that the weight member is supported in a freely suspended state. In the case where a triaxial acceleration sensor module is constructed from such a triaxial acceleration sensor, a sensor driving IC for driving the triaxial acceleration sensor, various elements such as resistance elements and capacitors, and the like are integrally formed on a module substrate (or in a package) in addition to the triaxial acceleration sensor (see Japanese Patent Laid-open Publication 2000-105252 as an example of a packaged semiconductor acceleration sensor).

Although such a conventional triaxial acceleration sensor module can be made thinner by arranging its components such as a triaxial acceleration sensor module on a module substrate in a planar manner, the setting area of the conventional triaxial acceleration sensor module becomes larger for that. For this reason, it is difficult to make the whole module smaller. On the other hand, in the case where a triaxial acceleration sensor and a sensor driving IC and the like are arranged on both major surfaces of a module substrate so as to be stacked with each other, it is difficult to make the whole module thinner though it is possible to make the setting area thereof smaller.

Further, as described above, the conventional triaxial acceleration sensor is provided with a gap so as to surround the weight member for assuring sufficient displacement of the weight member and preventing damage due to the excessive displacement of the weight member. This obstructs making the triaxial acceleration sensor module itself thinner.

SUMMARY OF THE INVENTION

Taking the above-mentioned and other problems into account, it is an object of the present invention to provide a triaxial acceleration sensor module and a method of manufacturing a triaxial acceleration sensor module in which a triaxial acceleration sensor and a sensor driving IC can be packaged by directly bonding them to each other via a through-hole of a module substrate (partition plate), and it is possible to make the triaxial acceleration sensor smaller and thinner.

In order to achieve the object, in one aspect of the present invention, the invention is directed to a triaxial acceleration sensor in which a triaxial acceleration sensor is packaged in a housing. The triaxial acceleration sensor module of the present invention includes:

a hollow housing provided with a partition plate, the partition plate having a through-hole;

a triaxial acceleration sensor provided inside the housing, the triaxial acceleration sensor comprising:
  a frame having an opening;
  a weight member provided inside the frame;
  a weight member supporting portion for supporting the weight member in a freely suspended manner; and
  a plurality of flexible beams provided to interconnect the frame and the weight member supporting portion, each of the flexible beams having piezo resistance elements thereon; and a sensor driving IC for driving the triaxial acceleration sensor, wherein the through-hole has a size through which the triaxial acceleration sensor can pass, and wherein the triaxial acceleration sensor is directly bonded to the sensor driving IC via the through-hole and the sensor driving IC is bonded to the partition plate of the housing.

According to the present invention, since the triaxial acceleration sensor module has such a configuration as described above, it is possible to reduce the thickness of the module (a package of the triaxial acceleration sensor module). Thus, it is possible to make the triaxial acceleration sensor module smaller and thinner effectively.

Further, in the triaxial acceleration sensor module of the present invention, it is preferable that the triaxial acceleration sensor has a bottom surface constructed from only the frame, and in a state where the sensor driving IC is bonded to the triaxial acceleration sensor, there is a gap having a predetermined length between the weight member and the sensor driving IC.

According to the present invention, since the triaxial acceleration sensor module has such a configuration that the frame of the triaxial acceleration sensor is directly bonded to the sensor driving IC by providing the gap at the bottom portion of the weight member, it is possible to omit the height (thickness) of a pedestal to be required in a conventional triaxial acceleration sensor module. Therefore, it is possible to make the triaxial acceleration sensor module further smaller and thinner.

Moreover, in the triaxial acceleration sensor module of the present invention, it is preferable that the predetermined length is in the range of 5 to 20 μm.

Since there is the gap having such a length between the bottom surface of the weight member and the sensor driving IC, the weight member can oscillate (displace) in the range of acceleration that the triaxial acceleration sensor can detect, and it is possible to prevent the excessive displacement of the weight member.

Further, in the triaxial acceleration sensor module of the present invention, it is preferable that the weight member is formed of a material whose specific gravity is greater than that of silicon.

This makes it possible to assure sufficient sensor sensitivity even though a part of the bottom portion of the weight member is removed in order to form the gap having a predetermined length. In addition, it is possible to make the triaxial acceleration sensor module smaller and thinner.

Further, in another aspect of the present invention, the invention is directed to a method of manufacturing a triaxial acceleration sensor module. In the triaxial acceleration sensor module, a triaxial acceleration sensor is packaged along with a driving IC for the triaxial acceleration sensor in a housing, the triaxial acceleration sensor comprising: a frame having an opening; a weight member provided inside the frame; a weight member supporting portion for supporting the weight member in a freely suspended manner; and a plurality of flexible beams provided to interconnect the frame and the weight member supporting portion, each of the flexible beams having piezo resistance elements thereon. The method includes the steps of:

forming the triaxial acceleration sensor;
preparing a hollow housing provided with a partition plate;
forming a through-hole in the partition plate of the housing, the through-hole having a size through which the triaxial acceleration sensor passes;
bonding the driving IC onto one major surface of the partition plate so that the through-hole is sealed by the driving IC; and
bonding the triaxial acceleration sensor onto the driving IC via the through-hole.

According to the method of manufacturing a triaxial acceleration sensor module of the present invention, since the triaxial acceleration sensor module thus manufactured has a configuration in which the triaxial acceleration sensor is directly bonded to the sensor driving IC, it is possible to manufacture a triaxial acceleration sensor module to be made smaller and thinner.

Further, in the method of the present invention, it is preferable that the step of forming the triaxial acceleration sensor comprises the steps of:

preparing a semiconductor substrate;
forming a plurality of piezo resistance elements on one major surface of the semiconductor substrate;
forming the weight member supporting, a part of the frame and the plurality of flexible beams by subjecting the semiconductor substrate to an etching process from the other major surface of the semiconductor substrate;
preparing a substrate formed of a material whose specific gravity is greater than that of silicon;
forming a gap on one major surface of the substrate, the gap having a predetermined depth;
bonding the other major surface of the substrate to the other major surface of the semiconductor substrate; and
forming the remaining part of the frame and the weight member by removing a part of the substrate.

In the method of manufacturing the triaxial acceleration sensor module according to the present invention, it is possible to omit the step of forming a pedestal in which a gap is formed in advance and the step of bonding the frame to the pedestal at the step of forming the triaxial acceleration sensor. For this reason, it is possible to simplify the manufacturing steps. In addition, since the weight member is formed of a material whose specific gravity is greater than that of silicon, it is possible to make the triaxial acceleration sensor module further smaller and thinner while maintaining the sensor sensitivity of the triaxial acceleration sensor.

Further, in the method of the present invention, it is preferable that the material whose specific gravity is greater than that of silicon includes a Pyrex® glass.

As a material of a package of the triaxial acceleration sensor module, plastics, metals, glass epoxy resins, ceramics or the like are normally used. However, in the case where the frame of the triaxial acceleration sensor is formed of Pyrex® glass, it is possible to obtain good temperature characteristics of the triaxial acceleration sensor module without generating a stress in the vicinity of an interfacial boundary thereof due to the difference of coefficients of thermal expansion between the frame of the triaxial acceleration sensor and the sensor driving IC. This is because the sensor driving IC is normally formed of silicon. In other words, it is possible to reduce offset voltage due to such stress even though a usage environmental temperature becomes high or low temperature to some extent.

The foregoing and other objects, features and advantages of the present invention will become more readily apparent from the following detailed description of a preferred embodiment of the present invention given in conjunction with the accompanying drawings.

DETAILED DESCRIPTION OF THE INVENTION

Hereinafter, preferred embodiments of a triaxial acceleration sensor module and a method of manufacturing the same according to the present invention will be described with reference to the appended drawings.

Figure 1:
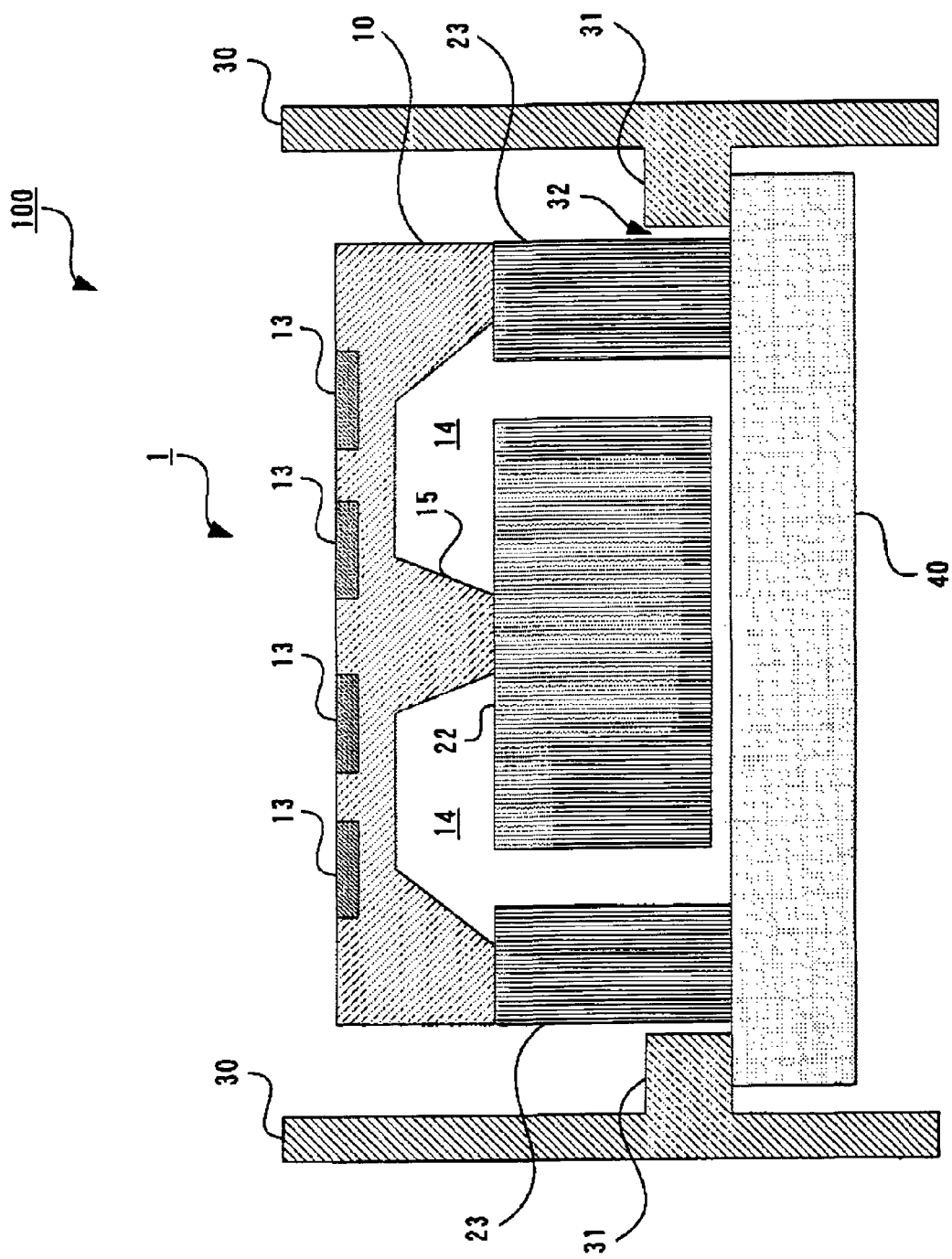
FIG. 1 is a vertical cross-sectional view of a triaxial acceleration sensor module according to the present invention.

FIG. 1 is a vertical cross-sectional view of a triaxial acceleration sensor module according to the present invention. In the following description using FIG. 1, for convenience of description, it is to be noted that the upper side and the lower side in FIG. 1 will be referred to as the "upper side" and "lower side", respectively.

A triaxial acceleration sensor module 100 of the present invention is mainly provided with a triaxial acceleration sensor 1, a sensor driving IC 40 for driving the triaxial acceleration sensor 1, and a hollow housing (package) 30.

As shown in FIG. 1, the triaxial acceleration sensor 1 is constructed from: a silicon substrate (semiconductor substrate) 10 provided with a weight member supporting portion 15; a weight member 22 supported by the weight member supporting portion 15 in a freely suspended manner; and a frame 23 provided outside the weight member 22 in a spaced-apart relationship with respect to the weight member 22 by a predetermined interval, the frame 23 having an opening.

In the silicon substrate 10, the weight member supporting portion 15 is supported by four beams (not shown in the drawings), and some piezo resistance elements 13 (four piezo resistance elements 13 are shown in the cross-sectional view of FIG. 1) are formed in the vicinity of the surface of each of the four beams.

In the case where the acceleration in a predetermined direction is applied to the triaxial acceleration sensor 1, the weight member 22 oscillates in the corresponding direction, by which some piezo resistance elements 13 elastically deform, so that the resistance values of the deformed piezo resistance elements 13 vary. The triaxial acceleration sensor 1 is adapted to be able to detect acceleration in 3-axis directions by detecting the variation of the resistance values of the piezo resistance elements 13 by means of three bridge circuits (not shown in the drawings). In this regard, the configuration of the bridge circuits will be described later.

In the present embodiment, the weight member 22 and the frame 23 are formed of Pyrex® glass. Since specific gravity of the Pyrex® glass is greater than that of silicon, it is possible to heighten the sensor sensitivity of the triaxial acceleration sensor 1 compared with the case where a weight member 22 is formed of silicon. In this regard, the constituent material of the weight member 22 and the frame 23 is not limited to the Pyrex® glass, and any material whose specific gravity is greater than that of silicon may be used. However, taking into consideration the manufacturing steps for the triaxial acceleration sensor 1 (will be described later), that is, one step of the method of manufacturing the triaxial acceleration module 100, the weight member 22 and the frame 23 may be formed of a transparent or half-transparent material.

Further, referring to FIG. 1, the triaxial acceleration sensor 1 is bonded to the sensor driving IC 40 via the frame 23 thereof. In a state where the triaxial acceleration sensor 1 is mounted on a flat surface of the sensor driving IC 40, there is a gap having a predetermined length between the bottom surface of the weight member 22 and the bottom surface of the sensor driving IC 40. Since the triaxial acceleration sensor 1 is provided with the gap having a predetermined length in this way, it is possible to support the weight member 22 by means of the weight member supporting portion 15 in a freely suspended manner. In addition, by constructing such a configuration, it is possible to assure sufficient displacement (oscillation) of the weight member 22, and it is possible to prevent the excessive displacement of the weight member 22. In view of this point, it is preferable that the length of the gap is in the range of about 5 to 20 μm.

The piezo resistance elements 13 are connected to each other via aluminum wiring lines (metal wiring lines) on the upper surface of the silicon substrate 10 (not shown in the drawings). The terminals of the aluminum wiring lines are also connected to a plurality of aluminum pads (electrode pads) for outputting the resistance values of the piezo resistance elements 13 (not shown in the drawings). Further, each of the aluminum pads is connected to the sensor driving IC 40 via electrode pads and the like by means of wire bonding. In this regard, the piezo resistance elements 13, the aluminum wiring lines and the aluminum pads cooperate to constitute three bridge circuits that serve a sensor to detect acceleration acting on the triaxial acceleration sensor 1 in the 3-axis directions.

As shown in FIG. 1, the housing 30 has a tubular shape and a size so that the triaxial acceleration sensor 1 and the sensor driving IC 40 can be housed therein. Further, the housing 30 is provided with a partition plate (bottom surface of the housing 30) 31, which divides the inner space of the housing 30 into two, substantially in the middle of the inner space thereof. In the triaxial acceleration sensor module 100 of the present invention, as shown in FIG. 1, a through-hole 32 through which the triaxial acceleration sensor 1 can pass is provided in the partition plate 31. The triaxial acceleration sensor module 100 is constructed so that the triaxial acceleration sensor 1 passes through the through-hole 32 down the housing 30 and the bottom surface of the frame 23 in the triaxial acceleration sensor 1 is bonded to one major surface (bottom surface) of the sensor driving IC 40.

In this regard, the triaxial acceleration sensor module 100 is constructed so that the surface area of the sensor driving IC 40 is larger than the size of the through-hole 32. The sensor driving IC 40 is bonded to the portion of the partition plate 31 other than the through-hole 32 so as to seal the through-hole 32. It is preferable that a lid or the like is provided on the top of the triaxial acceleration sensor 1 shown in FIG. 1 in order to prevent dust, and it is also preferable that the lower portion of the sensor driving IC 40 is subjected to molding. In this case, the sensor driving IC 40 may be pressed toward upper side of FIG. 1 to be fixed in the triaxial acceleration sensor module 100 by means of the molding. If the sensor driving IC 40 is pressed in this way, the sensor driving IC 40 need not to be bonded to the partition plate 31.

Next, a detailed description will now be given for the manufacturing steps of the triaxial acceleration sensor 1 in the method of manufacturing the triaxial acceleration sensor module 100 according to the present invention with reference to FIGS. 2 and 3.

Figure 2:
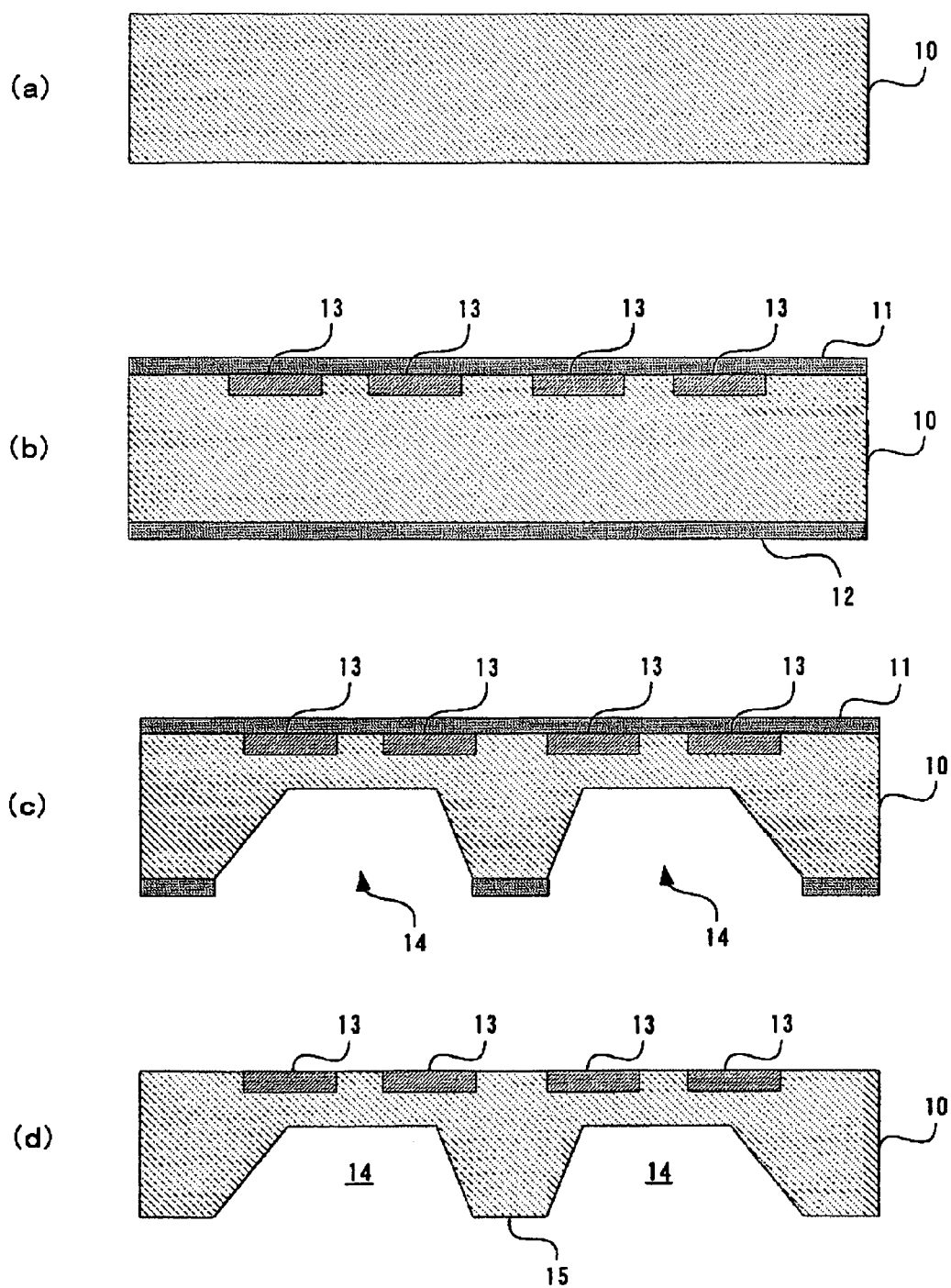
FIG. 2 is a vertical cross-sectional view which shows a method of manufacturing a triaxial acceleration sensor included in the triaxial acceleration sensor module shown in FIG. 1.
Figure 3:
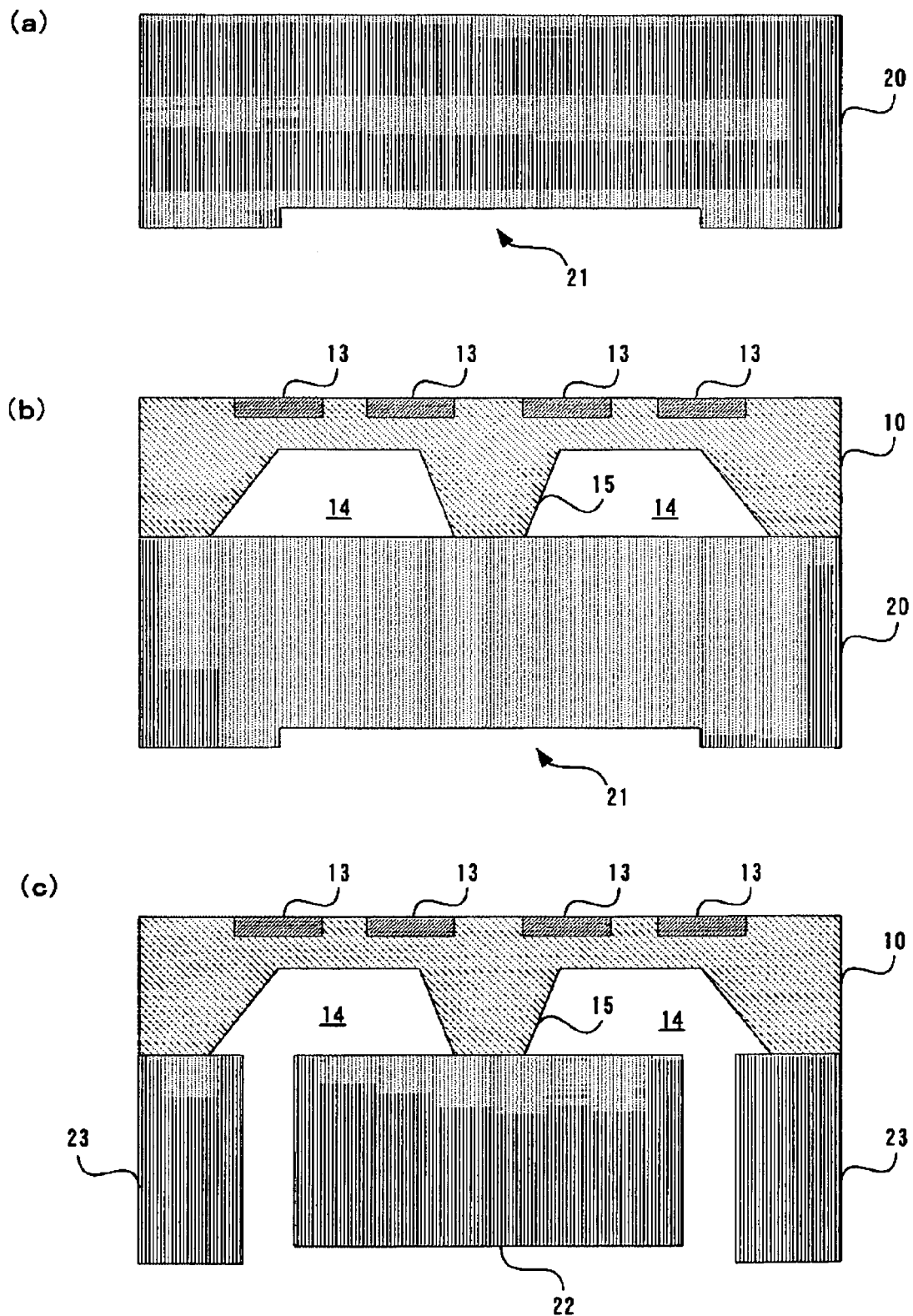
FIG. 3 is a vertical cross-sectional view which shows a method of manufacturing a triaxial acceleration sensor included in the triaxial acceleration sensor module shown in FIG. 1.

FIGS. 2 and 3 are vertical cross-sectional views which show a method of manufacturing a triaxial acceleration sensor 1 included in the triaxial acceleration sensor module 100 shown in FIG. 1. In the following description using FIGS. 2 and 3, for convenience of description, it is to be noted that the upper side and the lower side in FIGS. 2 and 3 will be referred to as the "upper side" and "lower side", respectively.

First, as illustrated in FIG. 2(*a*), a silicon substrate 10 is prepared. In the present embodiment, the thickness of the silicon substrate 10 is 200 μm, for example.

The silicon substrate 10 is heated in an oxidizing atmosphere so that silicon oxide layers 11 and 12 are formed on the top and bottom major surfaces of the silicon substrate 10. In this case, it is preferable that the thickness of each of the silicon oxide layers 11 and 12 is in the range of 0.5 to 3.0 μm.

After formation of the silicon oxide layer 11, impurities such as boron are injected into the silicon substrate 10 from the side on which the silicon oxide layer 11 lies, and by subjecting the silicon substrate 10 to thermal treatment, the impurities are dispersed through the silicon substrate 10. Thus, as illustrated in FIG. 2(*b*), a plurality of piezo resistance elements 13 (in the cross-sectional view, four piezo resistance elements) are formed in the silicon substrate 10 in the vicinity of an interfacial boundary of the silicon substrate 10 and the silicon oxide layer 11 (piezo resistance elements formation step).

A part of the silicon oxide layer 12 positioned below the formed piezo resistance elements 13 are removed by means of an etching process. Then, by subjecting the portion of the silicon substrate 10 that no silicon oxide layer 12 coats to another etching process, concave portions 15 of trapezoidal shape in section are formed as illustrated in FIG. 2(*c*).

Subsequently, a resist layer is formed by means of a photolithography method on a predetermined area of the silicon oxide layer 11, that is, on the portion to be the beams (not shown in the drawings). Then, parts of the silicon oxide layer 11 that has not been covered by the resist layer are removed by means of a dry etching process such as plasma etching or the like. Thus, as illustrated in FIG. 2(*d*), a plurality of elastic beams to interconnect a part of the frame to the weight member supporting portion 15 are formed (beams formation step). In this regard, as can be seen from FIG. 2(*d*), each of the beams is sufficient thin so that the resistance values of the piezo resistance elements 13 can vary in response to the applied acceleration, that is, the portion of each of the piezo resistance elements can elastically deform in response to the applied acceleration. In the present embodiment, the thickness of each of the beams is about 14 μm.

Although the illustration is omitted, aluminum wiring lines (metal wiring lines) and aluminum pads (not shown in the drawings) are formed on the upper surface of the silicon substrate 10 by vapor-depositing aluminum on the top major surface of the silicon oxide layer 11 after forming the plurality of piezo resistance elements 13 and subjecting the silicon substrate 10 to an etching process after carrying out patterning onto the deposited aluminum layer.

Next, a glass substrate 20 formed of Pyrex® glass whose specific gravity is greater than that of silicon is prepared. By subjecting the glass substrate 20 to, for example, a blast process such as sand blast process, an etching process such as a chemical etching process and a reactive ion etching process, or a machining process such as milling as illustrated in FIG. 3(a), a gap 21 having a predetermined depth is formed (gap formation step). This makes it possible to assure a space where a weight member 22 to be formed at a subsequent step can oscillate. In this regard, it is preferable that the thickness of the glass substrate 20 is in the range of 100 to 200 µm and the depth of the gap 21 is in the range of 5 to 20 µm. In the case of using the blast process, it is possible to form the gap 21 in the glass substrate 20 from which the weight member 22 is formed at a subsequent step by means of a simple method.

Then, as illustrated in FIG. 3(b), the upper surface of the glass substrate 20 in which the gap 21 has been formed (the surface opposite to the surface where the gap 21 has been formed) is bonded to the lower surface of the silicon substrate 10 that has been formed as described above, that is, to the surface of the silicon substrate 10 on which the weight member supporting portion 15 has been formed by means of anodic bonding (substrate bonding step). In this case, in order to form the gap 21 between the bottom surface of the weight member 22 and the upper surface of the sensor driving IC 40 with accuracy at a weight member formation step (will be described later), it is preferable to take alignment the silicon substrate 20 and the glass substrate 20 so that the position of the glass substrate 20 at which the gap 21 has been formed substantially overlaps with the position of the silicon substrate 10 at which the weight member supporting portion 15 has been formed in the vertical direction. Since a transparent or half-transparent material such as Pyrex® glass is normally used as the constituent material of the glass substrate 20 for forming the weight member 22 as described above, it is possible to confirm (or check) the positional relationship between the gap 21 and the weight member supporting portion 15 visually when taking alignment. Therefore, no difficult work is required when taking alignment.

Subsequently, as illustrated in FIG. 3(c), by dicing the glass substrate 20 from the lower surface side thereof upward in FIG. 3(c), the weight member 22 supported by the weight member supporting portion 15 in a freely suspended manner and the frame 23 provided outside the weight member 22 in a spaced-apart relationship with respect to the weight member 22 by a predetermined interval are formed (weight member formation step). Through the steps as described above, the triaxial acceleration sensor 1 is completed.

Figure 4:
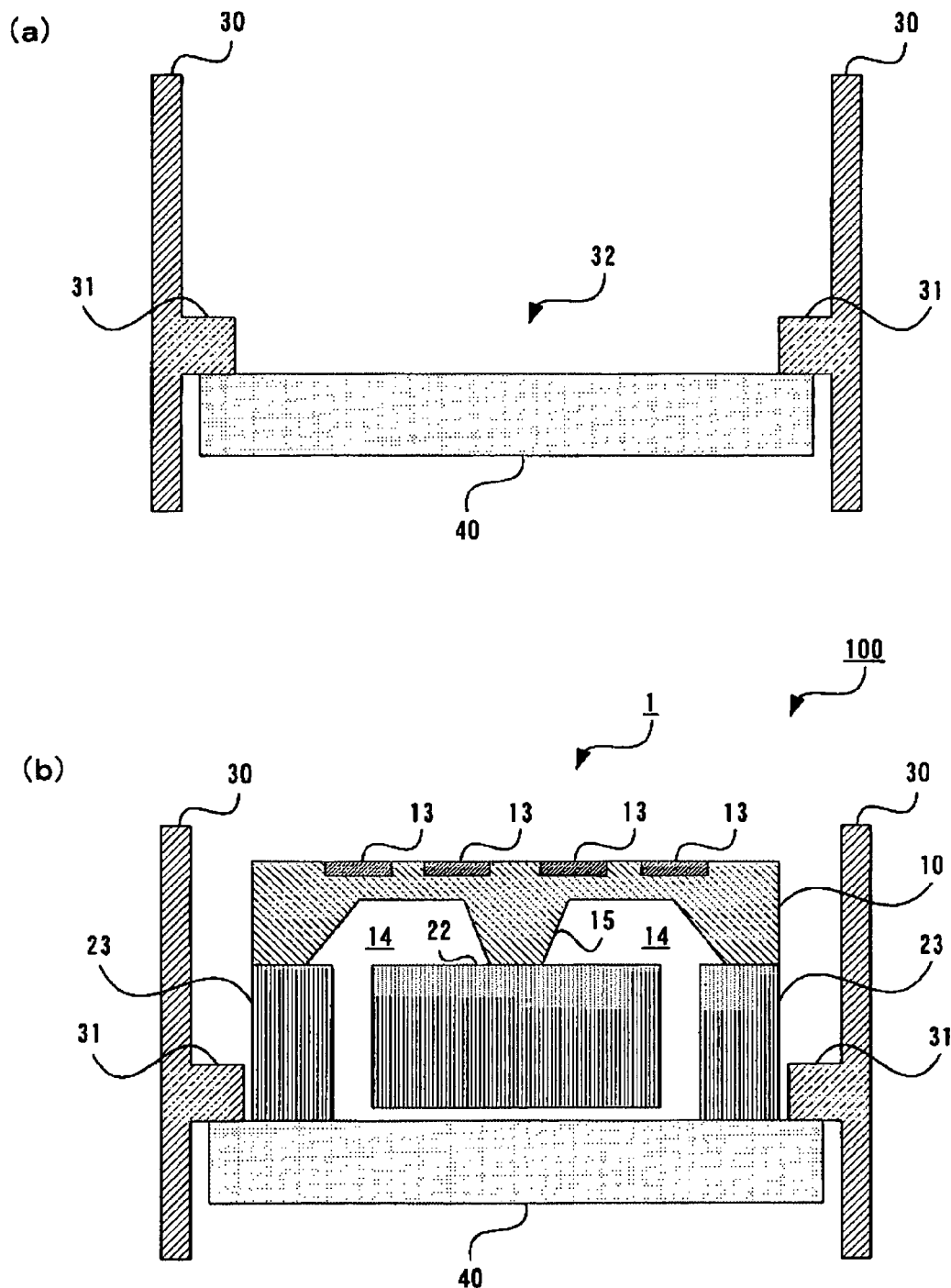
FIG. 4 is a vertical cross-sectional view which shows a method of manufacturing the triaxial acceleration sensor module shown in FIG. 1.

Next, the method of manufacturing the triaxial acceleration sensor module 100 according to the present invention will be described in detail with reference to FIG. 4. FIG. 4 is a vertical cross-sectional view which shows a method of manufacturing the triaxial acceleration sensor module 100 shown in FIG. 1. In the following description using FIG. 4, for convenience of description, it is to be noted that the upper side and the lower side in FIG. 4 will be referred to as the "upper side" and "lower side", respectively.

First, a tubular housing 30 having a quadrangular prism shape and a predetermined height is prepared. In the present embodiment, a partition plate 31 is formed at a predetermined height of the housing 30. The through-hole 32 as described above, that is, the through-hole 32 through which the triaxial acceleration sensor 1 manufactured as described above can pass is formed in the partition plate 31 (through-hole formation step).

Subsequently, as illustrated in FIG. 4(a), the sensor driving IC 40 is brought into contact with the partition plate 31 from the lower side in FIG. 4(a) so as to seal the through-hole 32, and they are bonded to each other (IC bonding step). In this case, if the triaxial acceleration sensor module 100 is subjected to molding from the lower side of the sensor driving IC 40 as described above, the sensor driving IC 40 needs not to be bonded to the partition plate 31.

Then, the triaxial acceleration sensor 1 manufactured by the manufacturing steps as shown in FIGS. 2 and 3 is directly brought contact with the sensor driving IC 40 through the through-hole 32, and bonded and fixed to the sensor driving IC 40 by means of resin adhesive or the like. Thus, the triaxial acceleration sensor module 100 of the present invention is completed. As described above, the gap 21 formed at the gap formation step is provided (arranged) between the bottom surface of the weight member 22 and the upper surface of the sensor driving IC 40. Thus, the weight member 22 is supported by the weight member supporting portion 15 in a freely suspended state (that is, in an oscillatable manner).

As illustrated above, according to the triaxial acceleration sensor module 100 of the present embodiment, the triaxial acceleration sensor 1 is directly bonded to the sensor driving IC 40 by providing the through-hole 32 in the partition plate 31 of the housing 30 without providing a pedestal of the triaxial acceleration sensor 1. For this reason, it is possible to make the triaxial acceleration sensor module 100 smaller and thinner. Further, in the present embodiment, the frame 23 of the triaxial acceleration sensor 1 is formed of a glass having a low coefficient of expansion such as a borosilicate glass, for example, Pyrex® glass, and the sensor driving IC 40 is normally formed of silicon. Since the coefficient of thermal expansion of Pyrex® glass is substantially the same as that of silicon, it is possible to obtain good temperature characteristics of the triaxial acceleration sensor module 100 without generating a stress in the vicinity of an interfacial boundary of the frame 23 and the sensor driving IC 40 due to the difference of coefficients of thermal expansion between the frame 23 of the triaxial acceleration sensor 1 and the sensor driving IC 40. In other words, it is possible to reduce offset voltage due to such stress even though a usage environmental temperature becomes high or low temperature to some extent. Moreover, since the weight member 22 is formed of a material whose specific gravity is greater than that of silicon (Pyrex® glass in the present embodiment), it is possible to maintain the sensor sensitivity of the triaxial acceleration sensor 1 at a high state even though the weight member 22 is made thinner by the gap 21 as described above.

Further, in the manufacturing steps for the triaxial acceleration sensor 1 in the method of manufacturing the triaxial acceleration sensor module 100 according to the present invention, the step of forming a pedestal in which a gap is formed in advance is not required, and the frame 23 of the triaxial acceleration sensor 1 is directly bonded and fixed to the sensor driving IC 40. Therefore, it is possible to reduce the number of steps in manufacturing the triaxial acceleration sensor module 100 (triaxial acceleration sensor 1). In other words, it is possible to simplify the manufacturing steps thereof.

Moreover, in the method of manufacturing the triaxial acceleration sensor module 100, since the weight member 22 of the triaxial acceleration sensor 1 is formed of Pyrex® glass, it is possible to confirm (or check) the positional relationship between the gap 21 and the weight member supporting portion 15 visually when taking alignment for the gap 21.

The triaxial acceleration sensor module and the method of manufacturing the triaxial acceleration sensor module according to the present invention have been described based on the embodiment shown in the drawings, but it is to be understood that the present invention is not limited to the embodiment, and respective portions constituting the triaxial acceleration sensor or the triaxial acceleration sensor module can be replaced with an arbitrary arrangement capable of functioning in the same manner. Further, any other arbitrary component may be added to the triaxial acceleration sensor or the triaxial acceleration sensor module of the present invention.

Although it has been described that the substrate for forming the weight member 22 and the frame 23 of the triaxial acceleration sensor 1 is the glass substrate 20 formed of Pyrex® glass, the present invention is not limited thereto. For example, a metal substrate formed of metal such as tungsten whose specific gravity is greater than that of Pyrex® glass, or the like may be used as such a substrate. In this case, although there is a possibility that the positional relationship between the gap 21 and the weight member supporting portion 15 cannot be visually checked (confirmed) when taking alignment as described above, it is possible to take required alignment of the gap 21 and the weight member supporting portion 15 using a known appropriate method.

Having described and illustrated the principles of the invention in a preferred embodiment thereof, it should be apparent that the invention can be modified in arrangement and detail without departing from such principles. We claim all modifications and variation coming within the spirit and scope of the following claims.

The invention claimed is:

1. A triaxial acceleration sensor module in which a triaxial acceleration sensor is packaged in a housing, the sensor module comprising:
a hollow housing provided with a partition plate, the partition plate having a through-hole and having a lower surface;
a triaxial acceleration sensor provided inside the housing, the triaxial acceleration sensor comprising:
a frame having an inner peripheral surface defining an opening and an outer peripheral surface;
a weight member provided inside the opening of the frame in a spaced-apart relationship with respect to the inner peripheral surface of the frame by a predetermined interval;
a weight member supporting portion for supporting the weight member in a freely suspended manner within the opening of the frame; and
a plurality of flexible beams provided to interconnect the frame and the weight member supporting portion, each of the flexible beams having piezo resistance elements thereon; and
a sensor driving IC for detecting changes in resistance values of the piezo resistance elements when acceleration in a predetermined direction is applied to the triaxial acceleration sensor and thereby the weight member oscillates in the corresponding direction so that some of the piezo resistance elements are elastically deformed, the sensor driving IC having an upper surface,
wherein the through-hole has a size so that the triaxial acceleration sensor is received through a predetermined gap between the outer peripheral surface of the frame and an inner peripheral of the partition plate defining the through-hole, and wherein the triaxial acceleration sensor is directly bonded to the upper surface of the sensor driving IC via the through-hole and the sensor driving IC is bonded to the lower surface of the partition plate of the housing.

2. The sensor module as claimed in claim 1, wherein the triaxial acceleration sensor has a bottom surface constructed from only the frame, and in a state where the sensor driving IC is bonded to the bottom surface of the triaxial acceleration sensor, there is a gap having a predetermined length between the weight member and the upper surface of the sensor driving IC.

3. The sensor module as claimed in claim 2, wherein the predetermined length is in the range of 5 to 20 μm.

4. The sensor module as claimed in claim 1, wherein the weight member is formed of a material whose specific gravity is greater than that of silicon.

5. The sensor module as claimed in claim 1, wherein the frame and the weight member are formed of the same material.

6. The sensor module as claimed in claim 5, wherein the weight member supporting portion and the flexible beams are formed of a different material from that of the frame and the weight member.

7. The sensor module as claimed in claim 1, wherein the weight member supporting portion and the flexible beams are formed of silicon and the frame and the weight member are formed of borosilicate glass.

8. The sensor module as claimed in claim 7, wherein the borosilicate glass has the composition of a glass having a specific gravity greater than a specific gravity of silicon.

* * * * *